3,042,425
HOUSE TRAILER PROTECTIVE APRON
Carrol M. Cathey, 5111 Summers Lane, and Loren F. Wade, 4424 Bartlette St., both of Klamath Falls, Oreg., and Alwyn R. Bechtold, 1010 NE. Klamath Ave., Roseburg, Oreg.
Filed Aug. 7, 1959, Ser. No. 832,248
2 Claims. (Cl. 280—150)

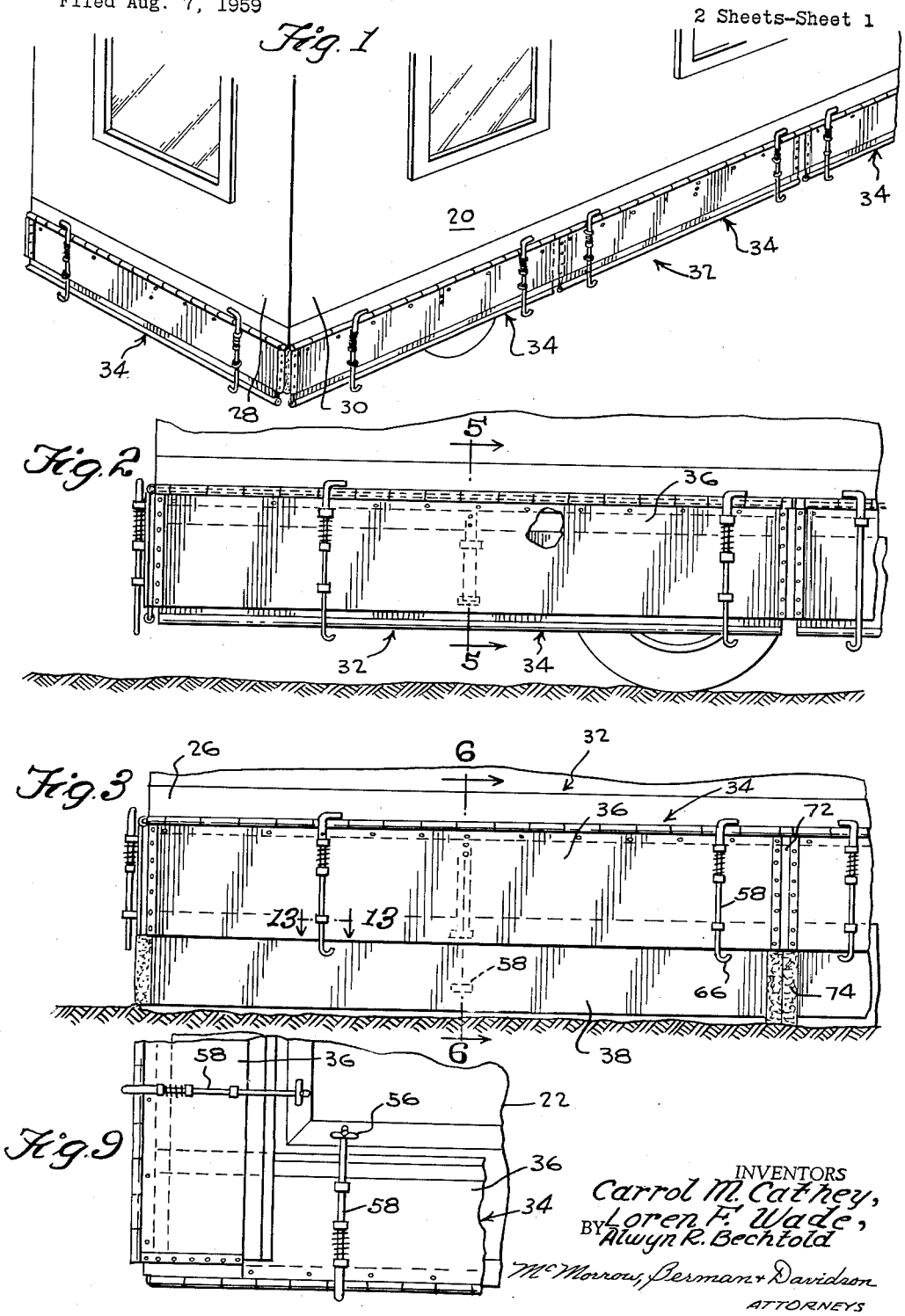

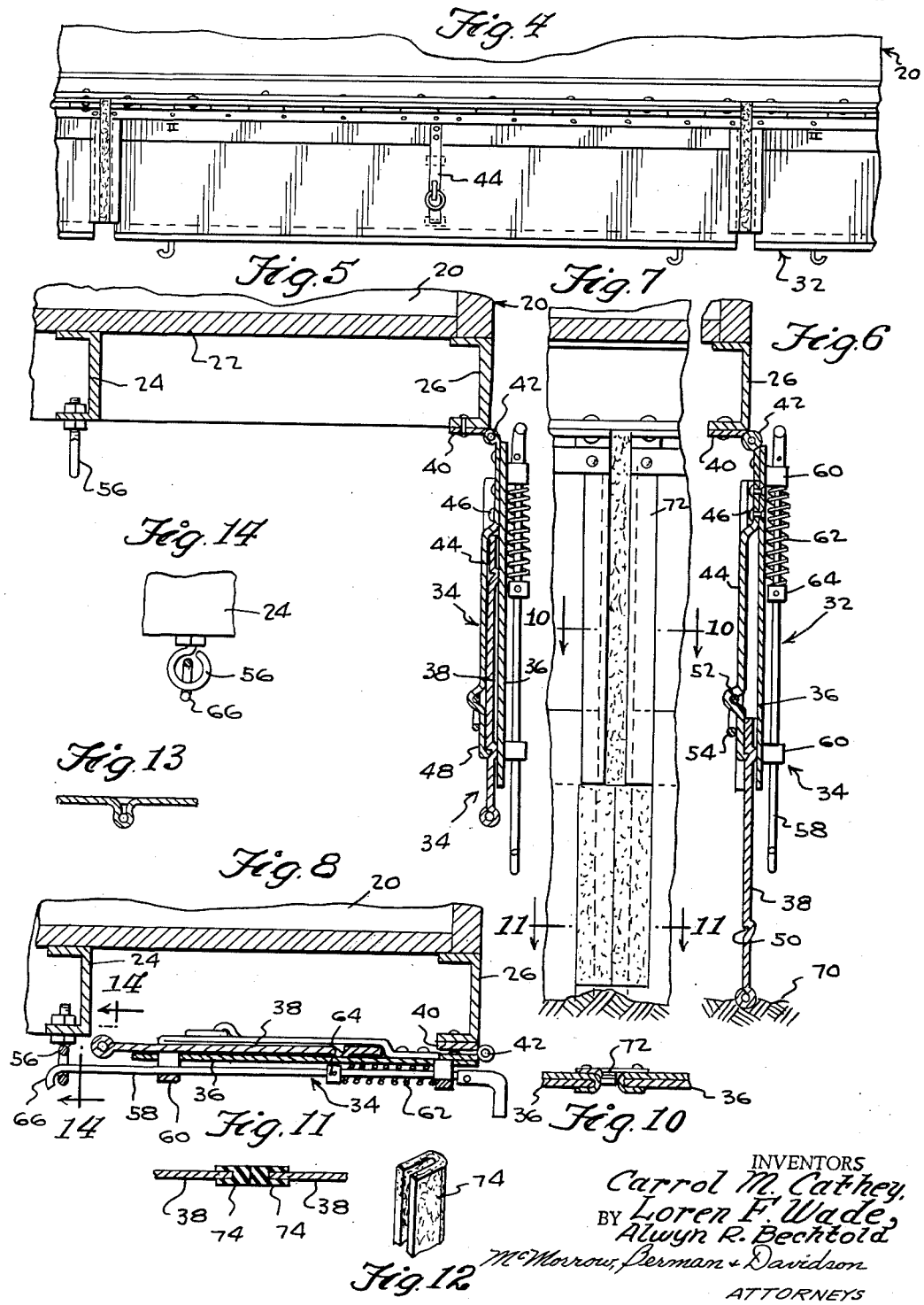

The present invention relates to house trailers generally and in particular to a protective apron for enclosing the space beneath a house trailer.

A house trailer ordinarily has the floor thereof spaced above the ground surface when the house trailer is in use as a residence. Unless the house trailer is to be semi-permanently or permanently located at the one site, generally it is impractical to provide a solid wall of masonry or the like about the perimeter of the house trailer. Unless the space beneath the house trailer is enclosed, substantial heat losses are experienced and the floors of the trailers having open spaces beneath their enclosures are cold during the winter months and are a source of much annoyance to the occupants. Frequently, when a trailer is more or less permanently located on a building site, the material is not at hand with which to enclose the space beneath the house trailer. Trailer occupants have found that the purchase of material to close the space beneath the trailer floor and the subsequent abandoning of the material for lack of storage space to carry the same is an unwarranted expense.

An object of the present invention is to provide a protective apron for the perimeter of a house enclosure which need not be discarded after use at one location but may be carried with the trailer house when the latter is transported to a new location.

Another object of the present invention is to provide a protective apron for enclosing the space beneath the house enclosure which lends itself to ready attachment to and detachment from a house enclosure, one which may be folded to a nested position beneath the house enclosure when not in use, and one which is highly effective in action.

A further object of the present invention is to provide a protective apron for a house enclosure which provides sealing means between adjacent panel units, such sealing means being effective in action and lending itself to ready connection of the adjacent ends of panel units, and one which is economically feasible.

These and other objects and advantages of the present invention will be fully apparent from the following description when taken in conjunction with the annexed drawings, in which:

FIGURE 1 is an isometric view of the corner of a house trailer or enclosure showing the protective apron of the present invention installed thereon;

FIGURE 2 is an elevational view of a portion of the assembly shown in FIGURE 1, with a portion broken away to show the substructure of the trailer, the upper and lower sections of the panel unit being shown in retractile position;

FIGURE 3 is a view similar to FIGURE 2 with the upper and lower sections of the panel units shown in extended position;

FIGURE 4 is an elevational view of the assembly shown in FIGURE 2, as seen from beneath the trailer;

FIGURE 5 is a view on an enlarged scale, taken on the line 5—5 of FIGURE 2;

FIGURE 6 is a view on an enlarged scale, taken on the line 6—6 of FIGURE 3;

FIGURE 7 is a fragmentary elevational view of the sealing means between the adjacent panel units, the panel sections being shown in the extended or extensile position;

FIGURE 8 is a view similar to FIGURE 5, with the panel units in the nested position;

FIGURE 9 is a plan view of the bottom of a corner of the trailer enclosure with the panel units in nested position;

FIGURE 10 is a view taken on the line 10—10 of FIGURE 7;

FIGURE 11 is a view taken on the line 11—11 of FIGURE 7;

FIGURE 12 is a fragmentary isometric view of one of the sealing means shown in FIGURES 10 and 11;

FIGURE 13 is a view taken on the line 13—13 of FIGURE 3; and

FIGURE 14 is a view taken on the line 14—14 of FIGURE 8.

Referring in greater detail to the drawings in which like numerals indicate like parts throughout the several views, the reference numeral 20 designates generally a house trailer or enclosure having a floor 22, supported upon channel members 24 and 26 adjacent one side thereof, as shown in FIGURES 5 and 8. End walls 28 and side walls 30 rise from the perimeter of the floor 22, one such end wall 28 and one such side wall 30 being shown in FIGURE 1.

The protective apron of the present invention is designated generally by the reference numeral 32. The apron 32 extends about and depends from the perimeter of the base of the enclosure 20, such base including the channel members 24 and 26 which are the frame upon which the floor of the house trailer rests.

The apron 32 comprises a plurality of vertically disposed elongated panel units 34 arranged in confronting end to end relation and positioned so as to extend about the perimeter of the base of the enclosure 20.

Each panel unit 34 consists in an upper panel section 36 and a lower panel section 38.

Each of the units 34 is of a height, when the sections 36 and 38 are extended relative to each other, to completely bridge the space between the base of the enclosure 20 and the ground surface.

Each unit 34 is connected to the enclosure base for swinging movement from the vertical position shown in FIGURE 5 to a nested position shown in FIGURE 8 beneath the base of the enclosure 20.

Referring to FIGURE 5, the section 36 has its upper edge connected by a leaf 40 and hinge pins 42 to the lower flange of the channel member 26.

The inner face of the section 36 of each unit 34 has a flat bar 44 depending from the upper end portion at a point substantially equidistant between the ends of the section 36, as shown in FIGURE 4. The bar 44 has its upper ends secured by rivets 46 (FIGURES 5 and 6) and is formed with a hook 48 on its lower end. The hook 48 is engageable in a recess 50 provided in the adjacent section 38 inwardly of and spaced from the lower ends of the latter. The bar 44 is provided with an eye formation 52 in which is coupled a ring 54 to which a cable may be attached for remote springing of the bar 44 away from the section 36 so as to release the section 38 when the unit 34 is in the vertical position.

The bar 44, hook 48, and recess 50 constitutes a means operatively connected to each unit 34 for releasably holding the upper and lower sections 36 and 38, respectively, in the retractile position.

Means is provided operatively connected to each of the units 34 for releasably holding each unit 34 in the nested position. This means consists in an eyebolt 56 secured in the lower flange of the channel member 24 and a slidable bolt 58 mounted on the exterior face of the section 36 for sliding movement into and out of the eyebolt 56 when the unit 34 is in the horizontal position nested beneath the enclosure 20, as shown in FIGURE 8.

Each bolt 58 is secured for sliding movement in sleeves 60 secured to the outer face of the panel section 36 and the coil spring 62 is interposed about each bolt 58 between the sleeves 60 and has one end bearing against a collar 64 secured to the bolt 58 and the other end bearing against the inner face of the uppermost sleeve 60. The spring 62 urges the associated bolt 58 to the position in which its curved end portion 66 (FIGURE 8) is received in the adjacent eye formation 56.

The upper end of each bolt 58 is turned to form a handle 68 by means of which the bolt 58 is shifted between engagement in the eye formation or eyebolt 56 and the position free of the eyebolt 56 so that the unit 34 may be swung from the horizontal position beneath the enclosure 20 to the vertical position for release of the bar 44 and dropping of the section 38 to the position in which the lower end of the section 38 engages the ground surface, designated by the numeral 70 in FIGURE 6.

Means is provided sealing the adjacent confronting ends of the sections 36 together, as shown in FIGURES 7 and 10, this means consisting in a resilient element 72 projecting between the confronting ends of the sections 36 and secured to one of the sections 36. In FIGURES 11 and 12 is shown the means for sealing the adjacent ends of the sections 38 together, such means consisting in a resilient U-shaped member 74 receiving the adjacent end portion of each section 38 and suitably secured thereto.

In FIGURE 9, it will be seen that at the corner of the enclosure 20 when the sections 36 are in the nested position, one section 36 overlies the other section 36, this being made possible by positioning one of the eyebolts 56 at a lower level than the other eyebolt 56 or by other suitable means.

In use, when it is desired to enclose the space beneath the house enclosure 20, each panel unit 34 is swung downwardly by first releasing the associated bolt 58 from the eyebolt 56. This permits the unit 34 to swing to the vertical position and when the ring 54 is pulled inwardly, the associated bar 44 has its hook 48 withdrawn from the recess 50 in the section 38, permitting the section 38 to drop to the ground-engaging position. With the units 34 in end to end confronting relation, the sealing means on the ends of the sections 36 engage each other and the sealing means on the ends of the section 38 engage each other, making a tight enclosure beneath the enclosure 20.

What is claimed is:

1. The combination with a house enclosure and means supporting said enclosure above a ground surface, of a protective apron extending about and depending from the perimeter of the base of said enclosure, said apron comprising a plurality of vertically disposed elongated panel units each embodying an upper panel section and a lower panel section extensible and retractable with respect to the upper panel section arranged in confronting end to end relation positioned so as to extend about the perimeter of the base of said enclosure, each of said units when said upper and lower panel sections are extended relative to each other being of a height to bridge the space between the base of said enclosure and a ground surface on which said enclosure is supported, each unit having the lower panel section disposed behind the inner face of the upper panel section, there being a recess in the lower panel section adjacent the lower end thereof, a vertically-disposed bar positioned contiguous to the inner face of the upper panel section and having the upper end dependingly connected to the upper panel section and having a hook on the lower end thereof engaging in the recess of the lower panel section to hold the latter in retractable position and releasable from engaging in the recess of the lower panel section to permit the latter to assume its extensible position, the upper end of the upper panel section of each unit being connected to said enclosure base for swinging movement of the apron from the vertical position to a nested position beneath said enclosure base, and bolt means on the upper panel section and detachably engageable with means on the base of said enclosure for holding the apron in the nested position.

2. The combination according to claim 1 wherein said bolt means embodies a bolt slidably supported on the upper panel section and detachably engages with means embodying an eye bolt on the base of said enclosure.

References Cited in the file of this patent

UNITED STATES PATENTS

| | | |
|---|---|---|
| 2,485,463 | Smith | Oct. 18, 1949 |
| 2,519,364 | Fredholm | Aug. 22, 1950 |
| 2,618,493 | Fransen et al. | Nov. 18, 1952 |
| 2,634,462 | Graven | Apr. 14, 1953 |
| 2,737,267 | Koch | Mar. 6, 1956 |
| 2,988,380 | Puckett et al. | June 13, 1961 |